US012538934B2

(12) United States Patent
Magen et al.

(10) Patent No.: US 12,538,934 B2
(45) Date of Patent: Feb. 3, 2026

(54) POLYHALITE ENRICHED FISH FEED

(71) Applicant: ICL EUROPE COOPERATIEF U.A., Amsterdam (NL)

(72) Inventors: Hillel Magen, Omer (IL); Menachem Assaraf, Lehavim (IL); Amir Gerber, Sheizaf (IL)

(73) Assignee: ICL EUROPE COOPERATIEF U.A., Amsterdam (NL)

( * ) Notice: Subject to any disclaimer, the term of this patent is extended or adjusted under 35 U.S.C. 154(b) by 958 days.

(21) Appl. No.: 17/712,030

(22) Filed: Apr. 1, 2022

(65) Prior Publication Data
US 2022/0386650 A1    Dec. 8, 2022

Related U.S. Application Data

(63) Continuation-in-part of application No. 17/051,082, filed as application No. PCT/IL2019/050504 on May 5, 2019, now Pat. No. 11,589,599, and a continuation-in-part of application No. PCT/IL2020/050923, filed on Aug. 24, 2020.

(60) Provisional application No. 62/909,283, filed on Oct. 2, 2019, provisional application No. 62/668,724, filed on May 8, 2018.

(51) Int. Cl.
*A23K 20/24* (2016.01)
*A23K 20/147* (2016.01)
*A23K 20/158* (2016.01)
*A23K 20/22* (2016.01)
*A23K 20/26* (2016.01)
*A23K 40/10* (2016.01)
*A23K 50/80* (2016.01)
*A61K 33/06* (2006.01)
*A61P 3/04* (2006.01)

(52) U.S. Cl.
CPC ............ *A23K 20/24* (2016.05); *A23K 20/147* (2016.05); *A23K 20/158* (2016.05); *A23K 20/22* (2016.05); *A23K 20/26* (2016.05); *A23K 40/10* (2016.05); *A23K 50/80* (2016.05); *A61K 33/06* (2013.01); *A61P 3/04* (2018.01)

(58) Field of Classification Search
CPC .... A23K 20/22; A23K 20/147; A23K 20/158; A23K 20/163; A23K 20/24; A23K 20/26; A23K 50/75; A23K 50/80; A23K 50/10; A23V 2002/00
USPC .......................................................... 426/74
See application file for complete search history.

(56) References Cited

U.S. PATENT DOCUMENTS 2,512,537 A     6/1950  Zellers
2006/0165840 A1  7/2006  Breivik
2006/0216396 A1  9/2006  Abbas
2006/0226051 A1  10/2006 Navarrette
2013/0303474 A1  11/2013 Rho
2018/0360732 A1  12/2018 Maddahi

FOREIGN PATENT DOCUMENTS

| CN | 103947866 A | 7/2014 |
|---|---|---|
| CN | 104187016 | 12/2014 |
| CN | 106135752 | 11/2016 |
| KR | 20090008543 | 1/2009 |
| WO | 9551205 A1 | 4/1995 |
| WO | 2008084074 A2 | 7/2008 |
| WO | 2017210768 A1 | 12/2017 |
| WO | 2018050860 A1 | 3/2018 |
| WO | 2019215724 A1 | 11/2019 |

OTHER PUBLICATIONS

NPL Predatory fish (Retrieved on Mar. 31, 2025). (Year: 2025).*
NPL Ca P ratio (Retrieved on Mar. 31, 2025). (Year: 2025).*
NPL Byrne et al. (In Sirius strikes feed intake . . . minerals supplement 2015). (Year: 2015).*
DairyCattleExtension.Org "How many pounds of feed does a cow eat in a day" DAIReXNET Aug. 16, 2019 (retrieved Sep. 26, 2021) 1 page.
fishfeedextruder.com How to Feed Tilapia in Different Growth Stages&How Much Nutrition They Need (retrieved Sep. 26, 2021) 5 pages.
How Much Feed Does a Chicken Eat—Fresh Eggs Daily® (Retrieved Sep. 26, 2021) 19 pages.
Ferreira et al. Use of polyhalite mineral as an acidogenic ingredient for prepartum diets of non-lactating dairy cows (in Can J Anim. Sci. 99, 2019). (Year: 2019), pp. 962-965.
Fish as animal retrieved on Apr. 23, 2021. (Year: 2021) 7 pages. https://www.britannica.com/animal/fish.
Mineral amount (Mineral supplement of Beef Cattle year 2007). (Year: 2007) 20 pages.
Polyhalite (From NPL Sirius Minerals 2015—Maiden animal feed take-or-pay offtake agreement). (Year: 2015) 2 pages.
Sarker et al. Halite; The Rock Salt: ENormous Health Benefits (in World Journal of Pharmaceutical Research vol. 5 (12): pp. 407-416, 2016) (Year 2016).
Thompson Larry J et al. Overview of Salt Toxicity, MSD Manual, Veterinary Manual 2015). (Year: 2015) 2 pages.
Office Action (Final Rejection) dated Nov. 15, 2021 for U.S. Appl. No. 17/051,082 (pp. 1-18).
Prior art Google scholar web search printable History retrieved on Apr. 23, 2021. This search retrieved the above NPL Sarker A et al. prior art used as prior art in the office action. (Year: 2021) 1 page.
Written Opinion of International Searching Authority; mailed Aug. 25, 2019 PCT/IL2019/050504, 4 pages.
European Search Report for App. No. EP19800237.0, dated Dec. 20, 2021, 5 pages.
Jane Byrne: "Sirius strikes feed market deal for four-in-one potash mineral supplement", Feed Navigator, Jan. 26, 2015 (Jan. 26, 2015), pp. 1-2, XP055811465, Retrieved from the Internet: URL:https://www.feednavigator.com/Article/2015/01/26/Sirius-strikes-feed-market-deal-for-four-in-one-potash-mineral-supplement [retrieved on Jun. 8, 2021].

(Continued)

*Primary Examiner* — Erik Kashnikow
*Assistant Examiner* — Bhaskar Mukhopadhyay
(74) *Attorney, Agent, or Firm* — AlphaPatent Associates Ltd.; Daniel J. Swirsky

(57) ABSTRACT

There is provided a fish feed composition comprising Polyhalite in a concentration between 0.5%-5% w/w.

8 Claims, 1 Drawing Sheet

(56) References Cited

OTHER PUBLICATIONS

Banrie : "Principles of fish nutrition", The Fish Site, Mar. 4, 2013 (Mar. 4, 2013), pp. 1-19, XP055811487, Retrieved from the Internet: URL:https://thefishsite.com/articles/principles-of-fish-nutrition [retrieved on Jun. 8, 2021].
Office Action (Non-Final Rejection) dated Apr. 11, 2022 for U.S. Appl. No. 17/051,082 (pp. 1-18).
Office Action (Notice of Allowance and Fees Due (PTOL-85)) dated Aug. 21, 2023 for U.S. Appl. No. 17/233,490 (pp. 1-11).
Indonesian Office Action (including English translation) issued in App. No. IDP00202204996, dated Dec. 22, 2023, 7 pages.
Fernando Kubitza, "Advances in tilapia nutrition", Global Aquaculture Advocate, (Aug. 12, 2019), pp. 1-8, URL: https://www.aquaculturealliance.org/advocate/advances-in-tilapia-nutrition-part-1, XP055811469.
Fernando Kubitza, "Advances in tilapia nutrition, part 2", Global Aquaculture Advocate, (Aug. 19, 2019), pp. 1-11, URL: https://www.aquaculturealliance.org/advocate/advances-in-tilapia-nutrition-part-2, XP055811476.
Barnie: "Principles of fish nutrient", Retrieved from the Internet: https://thefishsite.com/articles/principles-of-fishnutrition#:: text=Proteins%2C%20carbohydrates%20and%20lipids%20are,use%20the%20energy%2Dyielding°/o20nutrients. Mar. 4, 2013.
Keembiyehetty C.N., Gatlin D.M., "Evaluation of different sulfur compounds in the diet of juvenile sunshine bass (*Morone chrysops* ×*M. saxatilis*", Comparative Biochemistry and Physiology Part A: Physiology, (Sep. 1, 1995), vol. 112, No. 1, pp. 155-159, XP055811494.
Albert Tacon, "The nutrition and feeding of farmed fish and shrimp—a training manual", A Training Manual 1. The Essential Nutrients, Oct. 1, 2019, pp. 1-12, URL: https://web.archive.org/web/20191001194516/http:/www.fao.org/3/ab470e/AB470E06.htm, XP055811528.
Office Action (Notice of Allowance and Fees Due (PTOL-85)) dated Jan. 23, 2023 for U.S. Appl. No. 17/051,082 (pp. 1-2).
Office Action (Final Rejection) dated Feb. 8, 2023 for U.S. Appl. No. 17/233,490 (pp. 1-20).
English translation of Israeli Office Action issued in App. No. IL277013, dated Mar. 27, 2023, 4 pages.
Office Action (Non-Final Rejection) dated Dec. 20, 2022 for U.S. Appl. No. 17/233,490 (pp. 1-9).
Extended European Search Report issued in App. No. EP20872707, dated Apr. 21, 2023, 6 pages.
Fernando Kubitza: "Advances in tilapia nutrition", Global Aquaculture Advocate, Aug. 12, 2019 (Aug. 12, 2019), pp. 1-8, XP055811469.
Fernando Kubitza: "Advances in tilapia nutrition, part 2", Global Aquaculture Advocate, Aug. 19, 2019 (Aug. 19, 2019), pp. 1-11, XP055811476.
Nwanna L.C. et al.: "Effect of different levels of phosphorus on growth and mineralization in African giant catfish *Heterobranchus bidorsalis* (Geoffrey Saint Hillarie, 1809)", J. App. Sci. Environ. Manage., vol. 12, No. 4, Dec. 31, 2008 (Dec. 31, 2008), pp. 25-32, XP055811481.
Keembiyehetty C.N., Gatlin D.M.: "Evaluation of different sulfur compounds in the diet of juvenile sunshine bass (*Morone chrysops* x *M. saxatilis*", Comparative Biochemistry and Physiology Part A: Physiology, vol. 112, No. 1, Sep. 1, 1995 (Sep. 1, 1995), pp. 155-159, XP055811494.
Albert Tacon: "The nutrition and feeding of farmed fish and shrimp—a training manual", A Training Manual 1. The Essential Nutrients, Oct. 1, 2019 (Oct. 1, 2019), pp. 1-12, XP055811528.
Office Action (Notice of Allowance and Fees Due (PTOL-85)) dated Sep. 26, 2022 for U.S. Appl. No. 17/051,082 (pp. 1-11).
Office Action (Notice of Allowance and Fees Due (PTOL-85)) dated Oct. 14, 2022 for U.S. Appl. No. 17/051,082 (pp. 1-5).
Office Action (including English translation) issued in Israel Patent App. No. 291518 dated Dec. 3, 2024, 5 pages.
Office Action (including English translation) issued in Indonesia Patent App. No. IDP00202204996 , dated Sep. 2, 2024, 7 pages.
Office Action (Including English translation) issued in Brazil Patent App. No. BR112022006170 dated May 28, 2025, 7 pages.

* cited by examiner

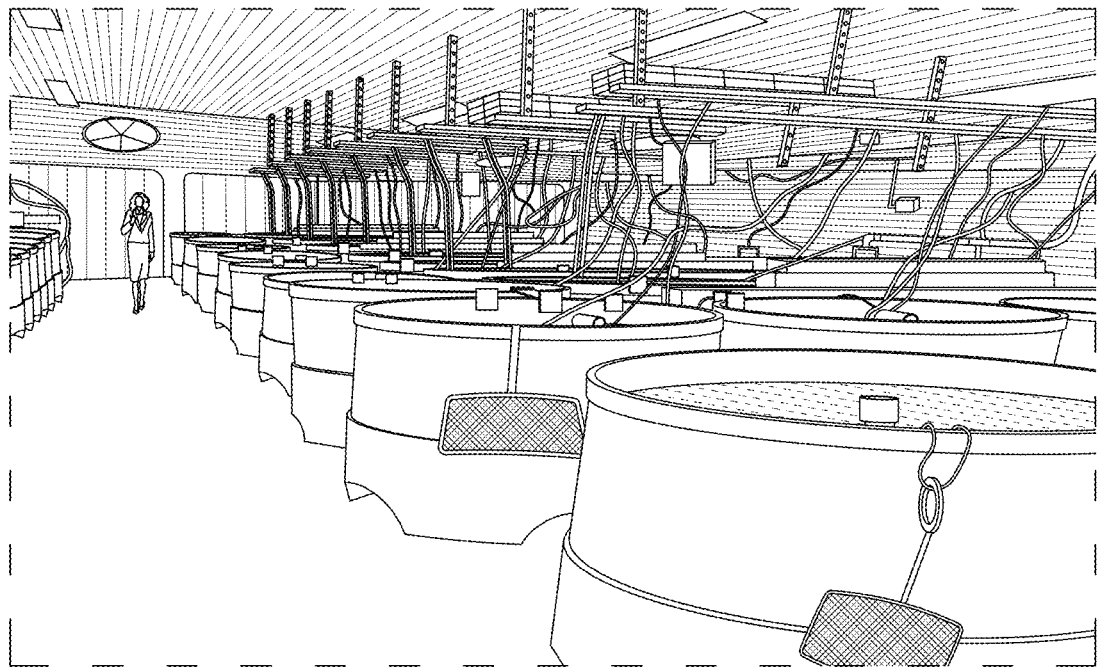
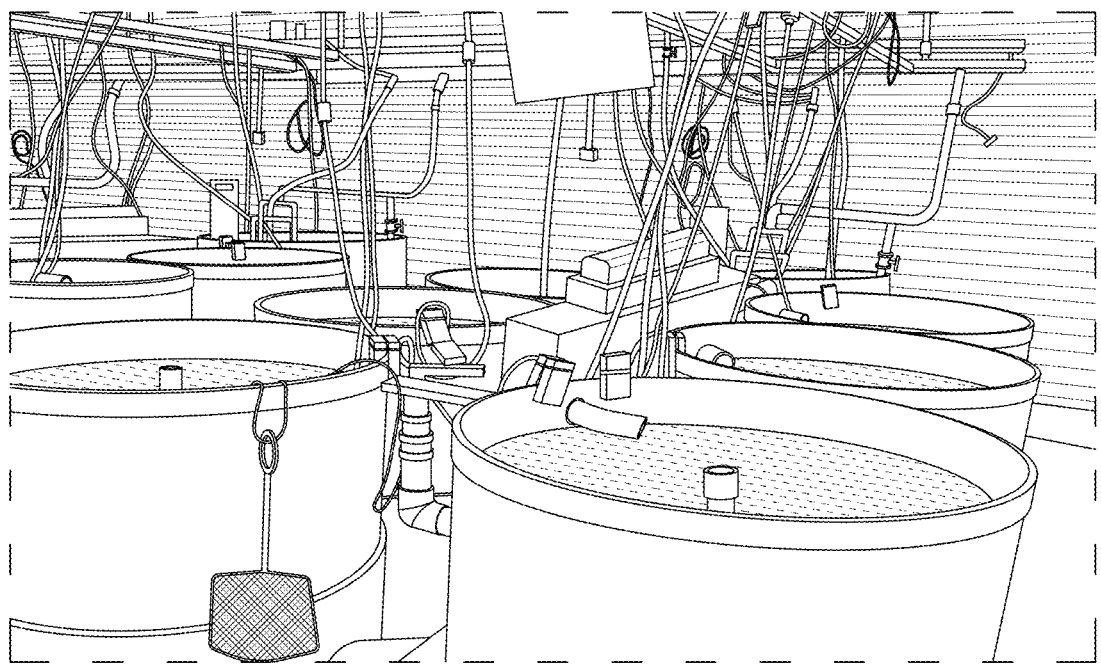

POLYHALITE ENRICHED FISH FEED

FIELD OF THE INVENTION

The present invention relates to a fish feed composition that comprises Polyhalite and a process for the preparation thereof.

BACKGROUND OF THE INVENTION

Aquaculture is the fastest growing sector in agriculture with an annual growth rate of close to 10%. This is due to the fact that world fisheries have reached a plateau while the demand for fish is growing. Of the edible fish, predatory species constitute a rapidly growing sector of aquaculture. This trend is based on the fact that these fish have stronger and firmer muscles (the main consumed part of the fish). An example of a predatory fish is the Salmon with an annual production of 1.5 million tonnes, the Asian sea bass (Lates calcarifer) also known as barramundi is emerging as one of the predatory fish with a fastest growing market and many more.

The costs of marine feeds comprise a major portion of the expenses incurred in the farming of these animals. For example, in a typical aquaculture farm, fish feed represents about 50-60% of the total direct production expenses.

Since the cost of feed is the major expense in the fish production unit, any change that will lead to more efficient utilization of the feed will have a substantial impact on the profitability of these production systems. This, in addition to the beneficial environmental effects stemming from less pollution discharge to the water.

Fish utilize protein for energy purposes and therefore compared to terrestrial animal feeds, fish feeds are rich in proteins, often amounting to 40-50% of the feed.

Usually the source of protein is fishmeal that is becoming a rare and expensive commodity. The nitrogenous products (ammonia, nitrite and nitrate) and phosphorous coming from either leftover food, or partially digested protein and food are harmful to the fish themselves, can lead to growth retardation and at high levels cause mortality.

Fish utilize protein for energy purposes and therefore compared to terrestrial animal feeds, fish feeds are rich in proteins, often amounting to 40-50% of the feed. Usually the source of protein is fishmeal that is becoming a rare and expensive commodity. The nitrogenous products (ammonia, nitrite and nitrate) and phosphorous stemming from either leftover food, or partially digested protein and food are harmful to the fish themselves, can lead to growth retardation and at high levels cause mortality. A reduction in the amount of food wastage produced by the fish and especially those harmful to the environment will enable substantial saving on production of fish at high densities; concomitantly the effluents of the fish farms will not have an adverse impact on the environment.

BRIEF DESCRIPTION OF THE DRAWINGS

The present invention will become fully understood from the detailed description given herein below and the accompanying drawings, which are given by way of illustration and example only, and thus not limiting in any way, wherein:

FIG. 1 depicts pictures of a Fish Rearing Facility, in accordance with some demonstrative embodiments.

SUMMARY OF THE INVENTION

According to some demonstrative embodiments, there is provided herein a fish feed composition comprising Polyhalite in a concentration between 0.5%-5% w/w.

According to some embodiments, the fish may be a predatory fish.

According to some embodiments, the Polyhalite may be in a concentration between 1%-3% w/w.

According to some embodiments, the composition may be fed to the fish and include Polyhalite in a concentration of 2% w/w.

According to some embodiments, the composition may be fed to the fish on a daily basis.

DETAILED DESCRIPTION OF THE INVENTION

According to some demonstrative embodiments, there is provided herein a fish feed enriched with Polyhalite.

Polyhalite is an evaporite mineral, a hydrated Sulfate of Potassium, Calcium and Magnesium with formula: $K_2Ca_2Mg(SO_4)_4 \cdot 2H_2O$.

According to some embodiments, the addition of Polyhalite to the fish diets may provide a positive effect on feed utilization.

The building blocks of protein are amino acids. Almost half the amino acids are essential (meaning that they cannot be synthesized by the fish). From all amino acids, the 2 main essential amino acids for fish growth are lysine and methionine. The latter has a sulphur terminal.

According to some embodiments, some of the protein is catabolized by the fish for energy purposes as well as for meeting the body demand for sulphur. The protein containing fish feed may have lower levels of the essential amino acid methionine required by the fish for growth.

This process causes wastage that can be eliminated by supplying an alternative source of sulphur. A reduction in the amount of food wastage produced by the fish and especially those harmful to the environment will enable substantial saving on production of fish at high densities. This will concomitantly reduce the adverse impact on the environment due to effluents from the fish farms.

According to some embodiments, Polyhalite may be added to the fish feed to be used as a food diluent, allowing for the use of reduced amounts of fish feed without harming or diminishing the growth of the fish.

According to some demonstrative embodiments, the term "fish" as used herein may refer to any member of the marine (oceanic) or freshwater fish and the like.

According to some preferred embodiments, the fish of the present invention may preferably be a predatory fish including, for example, Salmon, the Asian sea bass (Lates calcarifer) and the like.

According to some demonstrative embodiments, there is provided herein a fish feed comprising polyhalite in a concentration of between 0.5-5% w/w of the weight of the fish feed, preferably, between 1-3% w/w, most preferably 2% w/w.

According to some embodiments, the composition may be fed to said animal on a daily basis.

According to some demonstrative examples, there is provided a method for producing an fish feed comprising polyhalite, wherein said method comprises mixing polyhalite, e.g., in a pellet, granule, powder or dust form, with a fish feed.

According to some demonstrative examples, there is provided a method for producing a fish feed comprising polyhalite, wherein said method comprises mixing polyhalite, e.g., in a pellet, granule, powder or dust form, preferably in powder form, with the feed.

According to some embodiments, modern fish feeds are made by grinding and mixing together ingredients such as fishmeal, vegetable proteins and binding agents such as wheat. Water may be added and the resulting paste is extruded through holes in a metal plate. The diameter of the holes sets the diameter of the pellets, which can range from less than a millimeter to over a centimeter. As the feed is extruded it is cut to form pellets of the required length. The pellets are dried and oils are added. Adjusting parameters such as temperature and pressure enables the manufacturers to make pellets that suit different fish farming methods, for example feeds that float or sink slowly and feeds suited to recirculation systems. The dry feed pellets are stable for relatively long periods, for convenient storage and distribution.

According to some other embodiments, with regard to fish feed, the Polyhalite may be added to the fish feed (bone ash, proteins, etc.) and may be extruded, to get a pellet shaped particle feed.

According to some embodiments, the Polyhalite may be dissolved in an aqueous environment in a continuous release manner, and this may have an impact of the uptake of the nutrients by the fish.

According to some embodiments a Standard grade of polyhalite may be used for incorporation into an the fish feed, however, in accordance with some other embodiments, other Polyhalite products and/or appearances may be used, including, for example, the Granular (up to 5 mm particles) and the Mini-Granular (up to 2 mm particles), and their mixtures in various percentages.

According to some embodiments, polyhalite may be added at the grinding and/or mixing stage.

According to some embodiments, the polyhalite may be added to fish food, especially to feed juvenile fish since in these fish the results would be more pronounced. According to some embodiments the polyhalite may be added on top of the regular diet components leading to a proportional reduction in all the other ingredients of the diet.

According to these embodiments, this may enable replacing expensive fish diet ingredients with polyhlite, which is considered a much cheaper ingredient, e.g., especially since the addition of polyhalite to the diet resulted in a positive effect (better growth and FCR) when added at a 0.75%-3% concentration, preferably at a 1-2% concentration.

According to some demonstrative embodiments, there is provided herein a fish feed comprising at least 30% protein w/w; 2% fat w/w; 3% fiber w/w; 0.5% phosphorous w/w; 0.5% calcium w/w; and 1% Polyhalite w/w According to some embodiments, the fish feed composition may include 35% protein w/w; 4% fat w/w; 5% fiber w/w; 1.2% phosphorous w/w; 1.2% calcium w/w; and 2% Polyhalite w/w

EXAMPLES

Example 1—Experimental Design

Fish

Growth and feed utilization study was conducted with juvenile male Nile tilapia (*Oreochromis niloticus*) fish.

An initial experiment was conducted in order to assess the effect of Polyhalite addition to the diet on feed consumption and growth. In this experiment, the fish were housed individually in glass aquariums each containing 40 liters that were all connected to a central biofilter. A total of 22 aquariums were employed. 11 received the control feed with no addition of Polyhalite and 11 received the control commercial feed manufactured by Zemach Feed Mill diet number 4622 containing 35% protein; 4% fat; 5% fiber; 1.2% phosphorous; 1.2% calcium. This feed was then enhanced with the addition of Polyhalite at a level of 2%.

The fish were reared in this system for a period of one month at a temperature of 26±1° C. During this period, they were fed twice daily (7 days a week). In order to monitor the effect of Polyhalite on feed consumption and growth the fish were hand fed twice a day ad libitum from a pre weighed container for each aquarium and at the end of each day, the amount of feed consumed was registered.

The results of this experiment showed that the addition of Polyhalite had no negative effect on food consumption and the fish receiving the Polyhalite at a level of 2% exhibited better growth (Table 1) and better FCR (Table 2). The Feed Conversion Ratio (FCR) is the amount of feed (in kg) consumed by an animal leading to a gain of one kg live weight.

Following the initial experiment that showed positive results, we moved to the large experiment in which different levels of Polyhalite were added to the diet of the fish.

Experimental Setup

One thousand experimental fish were brought to our lab and maintained for 2 weeks to acclimatize them to the lab conditions. Fish were then randomly housed at a density of 15 fish/tank each tank contained a total of 250 liters of water. Every six tanks were connected to a central biofilter through which the water was constantly circulated and purified circulation rate was equivalent to total tank volume replacement every 1.5 hours. The test feed used as control was a commercial extruded feed that is currently being used by fish farmers (for details see above). To this control feed (C) we added 1%, 2%, 3%, 4% and 5% Polyhalite (Standard grade). Each of the diets was tested in 6 replicates—a total of 36 tanks were used. Prior to the beginning of the experiment, the experimental fish were weighed and the very small or large fish were removed. Fish were then randomly stocked in the experimental tanks.

All the fish in each tank were weighed every 2 weeks in order to follow their growth rate as well as update the feeding level, set at 5% of the body mass per day. Food consumption level was recorded. Levels of ammonia and nitrate in the rearing water were monitored twice a week and water quality maintained. Water temperature was 26±1° C. The fish were kept under optimal growing conditions throughout the experimental growth period, which lasted 6 weeks.

The growth results of this experiment (mean average weight and specific growth rate) are presented in Tables 3 and 4. FCR calculated for all treatments is presented in Table 5.

TABLE 1

Table 1
Individual growth rate (% per day) of fish fed a control feed and feed with the addition of 2% Polyhalite

| Feed with the addition of 2% Polyhalite | Control feed with no addition of Polyhalite |
|---|---|
| 0.991 | 0.761 |
| 0.803 | 0.867 |
| 1.373 | 0.788 |
| 1.753 | 0.662 |
| 1.141 | 0.759 |
| 1.642 | 1.098 |

TABLE 1-continued

Table 1
Individual growth rate (% per day) of fish fed a control
feed and feed with the addition of 2% Polyhalite

| Feed with the addition of 2% Polyhalite | Control feed with no addition of Polyhalite |
|---|---|
| 0.849 | 0.568 |
| 1.076 | 0.532 |
| 0.986 | 1.204 |
| 1.048 | 0.781 |
| Average 1.166 | 0.802 |

The obtained difference in growth rate was highly significant (P < 0.00786)

TABLE 2

Table 2
Individual Feed Conversion Ratio of fish fed a control
feed and feed with the addition of 2% Polyhalite

| Feed with the addition of 2% Polyhalite | Control feed with no addition of Polyhalite |
|---|---|
| 1.023 | 1.325 |
| 1.050 | 1.083 |
| 0.952 | 1.130 |
| 0.726 | 1.557 |
| 0.943 | 1.625 |
| 0.771 | 1.120 |
| 1.431 | 1.769 |
| 1.335 | 2.289 |
| 1.538 | 0.917 |
| 1.055 | 1.276 |
| Average 1.082 | 1.409 |

The obtained difference in FCR was significant at P < 0.0494

TABLE 3

Table 3
Mean average weight at the end of the experiment (initial weight 2.6 gr)

| Treatment | Mean weight In grams | Significance (p < 0.05) | Survival |
|---|---|---|---|
| Control feed No Polyhalite | 16.72 ± 0.06 | b | 100% |
| Control feed + 1% Polyhalite | 17.57 ± 0.08 | a | 96% |
| Control feed + 2% Polyhalite | 16.25 ± 0.05 | b | 100% |
| Control feed + 3% Polyhalite | 16.30 ± 0.04 | b | 98% |
| Control feed + 4% Polyhalite | 16.15 ± 0.07 | b | 100% |
| Control feed + 5% Polyhalite | 15.30 ± 0.09 | c | 100% |

TABLE 4

Table 4
Mean specific growth weight (SGR) at the end of the experiment

| Treatment | Mean specific growth rate | Significance (p < 0.05) | Survival |
|---|---|---|---|
| Control feed No Polyhalite | 4.51 ± 0.017 | b | 100% |
| Control feed + 1% Polyhalite | 4.59 ± 0.024 | a | 96% |
| Control feed + 2% Polyhalite | 4.48 ± 0.013 | b | 100% |
| Control feed + 3% Polyhalite | 4.47 ± 0.008 | b | 98% |
| Control feed + 4% Polyhalite | 4.38 ± 0.022 | b | 100% |
| Control feed + 5% Polyhalite | 4.28 ± 0.026 | bc | 100% |

TABLE 5

Table 5
Mean Feed Conversion Rate (FCR) at the end of the experiment

| Treatment | Mean specific growth rate | Significance (p < 0.05) | Survival |
|---|---|---|---|
| Control feed No Polyhalite | 1.21 ± 0.003 | b | 100% |
| Control feed + 1% Polyhalite | 1.14 ± 0.008 | a | 96% |
| Control feed + 2% Polyhalite | 1.19 ± 0.006 | b | 100% |
| Control feed + 3% Polyhalite | 1.18 ± 0.007 | b | 98% |
| Control feed + 4% Polyhalite | 1.19 ± 0.008 | b | 100% |
| Control feed + 5% Polyhalite | 1.17 ± 0.009 | b | 100% |

Conclusions

The results of the experiments show that when Polyhalite is added to the fish diet at levels of 1-2% the growth results were better and the FCR was lower, meaning that less food is required in order to obtain the same growth. Addition of 3 or 4% resulted in slight retardation in growth but this was not significant. Adding 5% Polyhalite to the diet resulted in substantial growth retardation.

Example 2

Throughout the experiment, the fish were hand fed to satiation in order to better control the feed intake and monitor the animal behavior. Food was provided twice daily—early morning and afternoon. The polyhalite particle size for this experiments was 300-500 μm.

Fish

Growth and feed utilization study was conducted with juvenile Asian seabass fish (Later calcarifer) fish initial average weight was 8.45±0.17 gr.

The fish were reared in the system for a period of 7 weeks at a temperature of 27±1° C. During this period, they were hand fed twice daily—morning and afternoon (7 days a week).

Feed

The control commercial feed was manufactured by the European company BioMar, the diet contained 50.7% protein; 15% fat; 9.7% ash; 1.61% calcium; 1.5% fiber; 1.22% phosphorous; 0.49 sodium. The pellet diameter was 1.9 mm—suitable for fish of this size. This feed was then enhanced by the addition of Polyhalite at a concentration of 2%. Thus, the addition of the Polyhalite proportionally reduced the other components in the diet.

The fish were fed to satiation (until the fish stopped to consume) and the level of food consumed in each meal was recorded.

Experimental Setup

Experimental fish were brought to the lab and maintained for 2 weeks to acclimatize them to the lab conditions. Prior to the beginning of the experiment, the experimental fish were weighed and the very small or large fish were removed. Thus, selected fish weighing within a limited range were then randomly housed at a density of 20 fish/tank each tank contained a total of 250 liters of water. Every six tanks were connected to a central biofilter through which the water was constantly circulated and purified. Circulation rate was equivalent to total tank volume replacement every 1.5 hours. The test feed used as control was a commercial extruded feed that is currently being used by farmers of this fish, as mentioned hereinabove. To this control feed, polyhalite was added to prepare the test feed. Each of the dietary treatments was tested in 6 replicates. Due to excessive mortality in 4 tanks the number of replicates for each treatment was 4.

All the fish in each tank were weighed every 2 weeks in order to follow their growth rate. Food consumption level was recorded daily. Levels of ammonia and nitrate in the rearing water were monitored twice a week and water quality maintained. Water temperature was 27±1° C. The fish were kept under optimal growing conditions throughout the experimental growth period, which lasted for just under 2 months. The fish readily accepted all the experimental diets and there was no reduction in food consumption.

The growth results of this experiment as mean average weight attained is presented in Table 6.

Food Conversion Rate (FCR) of the fish is presented in Table 7. The lower the value the better the conversion rate.

TABLE 6

Mean average final weight of the fish in the control (no Polyhalite addition) compared to the addition at a 2% level (initial average weight 8.45 ± 0.17 gr)

| Treatment | Mean weight In grams | Significance ($p < 0.05$) |
|---|---|---|
| Control feed | 37.267 ± 1.59 | a |
| Control feed + 2% PolySulphate | 36.793 ± 1.07 | a |

TABLE 7

Mean Food Conversion ratio (FCR) at the end of the experiment

| Treatment | Mean FCR | Significance ($p < 0.05$) |
|---|---|---|
| Control feed | 0.693 ± 0.0351 | a |
| Control feed + 2% PolySulphate | 0.630 ± 0.1109 | a |

General Remarks

The experiment was conducted with juvenile fish since in these fish, if the material were to exhibit positive results, the differences in growth results would be more pronounced. The fish quadrupled their weight in the course of the experiment showing that the weight gain is based on the experimental diets.

The exceptional good feed conversion ratio obtained is due to the fact that the fish were hand fed till satiation (no wasted food that was not consumed) and the composition of the food which was the best commercial food for these fish containing a very high level of protein (over 50%). During the experimental period the fish were not exposed to any stress though the survival rate in some tanks was reduced due to the cannibalism that exists in these fish, especially in the early developmental stages.

CONCLUSIONS

The results of the experiments clearly show that there was no significant difference in the final weight attained and feed conversion ratio between the fish reared on the control diet and those reared on the same diet containing an addition of 2% Polyhalite The results of this experiment indicate that polyahlite may be used to significantly reduce the costs of fish feed whilst not diminishing the growth of the fish feed.

Reference is now made to FIG. 1, which depicts a Fish Rearing Facility (also referred to herein as the "Aquaculture holding facility"), in accordance with some demonstrative embodiments.

According to some embodiments, the Aquaculture holding facility is situated within an insulated building and has a set of experimental round plastic tanks of 250 liters each, every 6 tanks are connected to a central biofilter with a capacity of 350 liters.

In addition, fish can be held and monitored while they are acclimatized to the laboratory conditions in many glass aquariums. Growing conditions are carefully monitored and the fish are provided with optimal rearing conditions that include proper aeration, heating and water quality regulation. Depending on the size of the fish and their species, it is possible to hold a few thousand fish at one time in the facility.

While this invention has been described in terms of some specific examples, many modifications and variations are possible. It is therefore understood that within the scope of the appended claims, the invention may be realized otherwise than as specifically described.

What is claimed is:

1. A fish feed composition comprising Polyhalite in a concentration between 1%-2% w/w, wherein said fish is a predatory fish.

2. The composition of claim 1, wherein said composition is fed to fish and includes Polyhalite in a concentration of 2% w/w.

3. The composition of claim 1, wherein said composition is fed to said fish on a daily basis.

4. The composition of claim 1, comprising at least
30% protein w/w;
2% fat w/w;
3% fiber w/w;
0.5% phosphorous w/w;
0.5% calcium w/w; and
1% Polyhalite w/w.

5. The composition of claim 1, comprising
35% protein w/w;
4% fat w/w;
5% fiber w/w;
1.2% phosphorous w/w;
1.2% calcium w/w; and
2% Polyhalite w/w.

6. A method for producing a fish feed comprising polyhalite, wherein said method comprises mixing polyhalite in a concentration between 1%-2% w/w with said feed and wherein said fish is a predatory fish.

7. The method of claim 6, wherein said polyhalite is in a form selected from the group including, pellet, granule, powder or dust form.

8. The method of claim 7, wherein said polyhalite is in powder form.

* * * * *